United States Patent
Sun

(10) Patent No.: US 9,886,308 B2
(45) Date of Patent: Feb. 6, 2018

(54) DEVICE HAVING AN EMBEDDED SYSTEM INCLUDING STATE, AND A METHOD FOR CONTROLLING STANDBY OF AN EMBEDDED SYSTEM

(71) Applicant: HISENSE BROADBAND MULTIMEDIA TECHNOLOGIES CO., LTD., Qingdao (CN)

(72) Inventor: Zhenyin Sun, Qingdao (CN)

(73) Assignees: HISENSE BROADBAND MULTIMEDIA TECHNOLOGIES CO., LTD., Qingdao (CN); HISENSE USA CORPORATION, Suwanee, GA (US); HISENSE INTERNATIONAL CO., LTD., Qingdao (CN)

( * ) Notice: Subject to any disclaimer, the term of this patent is extended or adjusted under 35 U.S.C. 154(b) by 260 days.

(21) Appl. No.: 14/799,231

(22) Filed: Jul. 14, 2015

(65) Prior Publication Data

US 2016/0154675 A1    Jun. 2, 2016

(30) Foreign Application Priority Data

Dec. 2, 2014    (CN) .......................... 2014 1 0723731

(51) Int. Cl.
| | | |
|---|---|---|
| G06F 1/00 | (2006.01) | |
| G06F 9/48 | (2006.01) | |
| G06F 1/32 | (2006.01) | |
| G06F 9/44 | (2006.01) | |
| G06F 9/30 | (2006.01) | |
| G06F 9/445 | (2006.01) | |

(52) U.S. Cl.
CPC .......... *G06F 9/4881* (2013.01); *G06F 1/3225* (2013.01); *G06F 1/3275* (2013.01); *G06F 1/3287* (2013.01); *G06F 9/3009* (2013.01); *G06F 9/4418* (2013.01); *G06F 9/44594* (2013.01)

(58) Field of Classification Search
None
See application file for complete search history.

(56) References Cited

FOREIGN PATENT DOCUMENTS

| CN | 202838541 U | 3/2013 |
|---|---|---|
| CN | 103024543 A | 4/2013 |

OTHER PUBLICATIONS

Liu, Ruiting, "Course for NCRE 3, Database Technology," Oct. 31, 2002 (5 pages).
Zhao, Yuhui, "Basic Course for Concurrent Programming," Dec. 31, 2008 (7 pages).

*Primary Examiner* — Nitin Patel
(74) *Attorney, Agent, or Firm* — Harness, Dickey & Pierce, P.L.C.

(57) ABSTRACT

Disclosed is a method for controlling an embedded system and a device with an embedded system, the method including: transmitting, by a scheduling process of the embedded system, a standby instruction to a master process of the embedded system; releasing, by the master process, occupied hardware resource and exiting upon reception of the standby instruction; starting, by the scheduling process, a standby process of the embedded system after the master process exits; and controlling, by the standby process, the embedded system to enter a standby state.

20 Claims, 2 Drawing Sheets

US 9,886,308 B2

DEVICE HAVING AN EMBEDDED SYSTEM INCLUDING STATE, AND A METHOD FOR CONTROLLING STANDBY OF AN EMBEDDED SYSTEM

CROSS-REFERENCE TO RELATED APPLICATION

This application claims the benefit and priority of Chinese Patent Application No. 201410723731.9 filed Dec. 2, 2014. The entire disclosure of the above application is incorporated herein by reference.

FIELD

The present disclosure relates to the field of embedded systems and particularly to a method for controlling an embedded system and a device with an embedded system.

BACKGROUND

This section provides background information related to the present disclosure which is not necessarily prior art.

At present an embedded system device may be controlled by software to enter standby or to be awoken.

The system enters standby through controlling a high or low level output from a General Purpose Input Output (GPIO) to cut off a power supply to a part of peripherals while keeping a general power supply to the system, and lowering an operating frequency of the system so that the system enters sleep state, i.e., standby mode; and the system is awoken by controlling the high or low level output from the GPIO to resume the power supply to the peripherals, and resuming the operating frequency of the system gradually for the purpose of awaking the system.

Here before the power supply to the peripherals is cut off, threads in a master process of the embedded system release their occupied resource respectively, and the process starts a standby thread so that the standby thread controls the power supply to the peripherals to be cut off. If any thread fails to release the occupied system resource, then it may result in a failure to enter standby or unstableness of the system after being awoken.

SUMMARY

This section provides a general summary of the disclosure, and is not a comprehensive disclosure of its full scope or all of its features.

Some embodiments of the disclosure provides a method for controlling an embedded system, the method including:

transmitting, by a scheduling process of the embedded system, a standby instruction to a master process of the embedded system;

releasing, by the master process, occupied hardware resource and exiting upon reception of the standby instruction;

starting, by the scheduling process, a standby process of the embedded system after the master process exits; and controlling, by the standby process, the embedded system to enter a standby state.

Based upon the same inventive idea, some embodiments of the disclosure provides a device with an embedded system, the device including:

a processor; and a memory storing at least one instruction, wherein the at least one instruction is configured, when executed by the processor, to:

cause a scheduling process of the embedded system to transmit a standby instruction to a master process of the embedded system;

cause the master process to release occupied hardware resource and to exit upon reception of the standby instruction;

cause the scheduling process to start a standby process of the embedded system after the master process exits; and cause the standby process to control the embedded system to enter a standby state.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION

Processes involved in the embodiments of the disclosure will be firstly described before the embodiments of the disclosure are described in detail.

A scheduling process of an embedded system is configured to control another process to operate.

A master process of the embedded system is configured to enable a service of the embedded system.

A standby process of the embedded system is configured to control the embedded system to enter a standby state or to be awoken from the standby state.

The technical solutions according to some embodiment of the disclosure will be described below in details with reference to the drawings.

Figure 1:
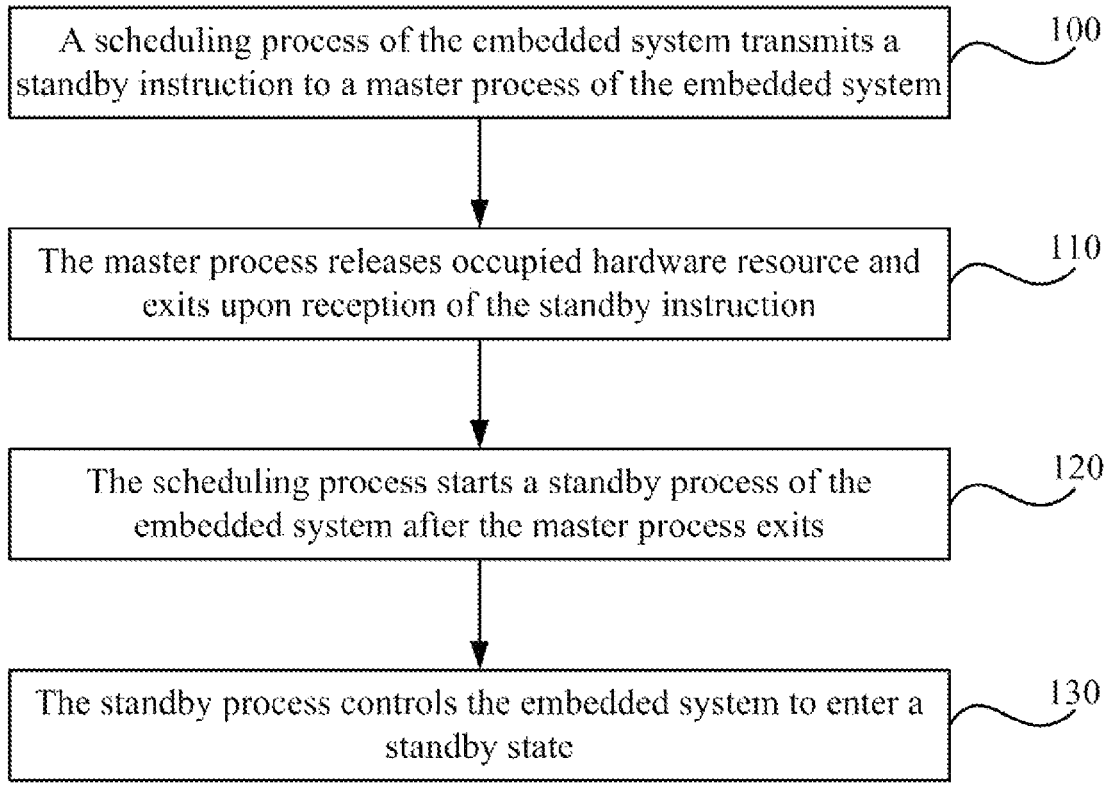
FIG. 1 illustrates a flow chart of a method for controlling an embedded system according to some embodiments of the disclosure.

FIG. 1 illustrates a method for controlling an embedded system according to some embodiments of the disclosure, which particularly includes the following operations:

In operation 100, a scheduling process of the embedded system transmits a standby instruction to a master process of the embedded system.

Typically there may be only one master process of the embedded system. If there are two or even more master processes of the embedded system, then the scheduling process may transmit standby instructions respectively to the operating master processes.

Here the standby instruction may be generated by the scheduling process upon detection of a standby command inputted by a user. The UE may input the standby command, for example, but not limited to, by using a standby button. The standby button may be arranged on a device of the embedded system or on a remote controller.

In operation 110, the master process releases occupied hardware resource and exits upon reception of the standby instruction.

Here the master process may release occupied software resource, e.g., a memory resource, etc., when the master process exists.

In operation 120, the scheduling process starts a standby process of the embedded system after the master process exits.

In operation 130, the standby process controls the embedded system to enter a standby state.

In the method according to some embodiments of the disclosure, the master process releases the occupied resource instead of the threads therein releasing their respective occupied resource respectively. Since the master process can force the resource occupied by the respective threads thereof to be released, such a situation will not occur that the resource occupied by the threads cannot be released, thus avoiding the system from failing to enter a standby state or from becoming instable after being awoken due to failure of the resource to be released. Moreover since the master process releases the resource and exits, in order to enable the system to enter a standby state, the standby process is created in some embodiments of the disclosure so that the standby process controls the embedded system to enter a standby state. The scheduling process controls the order in which the master process and the standby process are performed, so as to ensure stable operation of the system.

In some embodiments of the disclosure, the master process and the standby process may be set to a blocking mode.

In some embodiments of the disclosure, after the standby process is started, firstly the embedded system may be controlled to enter a standby ready state; and after the embedded system enters the standby ready state, then the embedded system may be controlled to enter the standby state, thus enabling rapid standby.

With the solution according to any one of the embodiments above of the disclosure, after the embedded system enters the standby state, if the embedded system needs to be awoken, the method may further include the following operations: the standby process determines that the embedded system needs to be awoken, and controls the embedded system to enter a standby ready state, and after the embedded system enters the standby ready state, the standby process releases the occupied hardware resource and exits, and after the standby process exits, the scheduling process starts the master process; or the method may further include the following operations: the standby process determines that the embedded system needs to be awoken, triggers the embedded system to be restarted, releases the occupied hardware resource, and exits, and after the embedded system is restarted, the scheduling process starts the master process.

Here the standby process may determine that the embedded system needs to be awoken, in response to a received awaking instruction transmitted by the scheduling process to the standby process; or the standby process may determine that the embedded system needs to be awoken, according to an awaking parameter transmitted by the scheduling process.

Here the awaking instruction or the awaking parameter may further include an indicator for indicating whether to restart the embedded system, and the standby process may determine from the indicator a particular mode to awake the embedded system. Of course after the embedded system enters the standby ready state, a prompt box may alternatively be popped up to prompt a user on deciding whether to restart the embedded system, so that the standby process may determine from an indication of the user a particular mode to awake the embedded system.

If the standby process determines that the embedded system needs to be awoken, according to the awaking parameter transmitted by the scheduling process, then after the master process exits, the scheduling process may further transmit to the standby process an awaking parameter including at least automatic awaking time. Accordingly the standby process may determine that the embedded system needs to be awoken, according to the automatic awaking time. For example, the standby process may start an awaking timer upon reception of the automatic awaking time, where a counting length of time of the awaking timer is a length of time indicated by the automatic awaking time; and the standby process may determine that the embedded system needs to be awoken, when the awaking timer expires.

It shall be noted that with the solution according to any one of the embodiments above of the disclosure, after the master process exits, the scheduling process may transmit both the awaking parameter and a standby control parameter to the standby process, so that the standby process may control the embedded system to enter the standby state, according to the standby control parameter.

In some embodiment of the disclosure, in the standby process and the awaking process, the standby process controlling the embedded system to enter the standby ready state refers to controlling the embedded system to be reinitialized by configuring the standby control parameter and the awaking parameter. The standby process may reinitialize the embedded system according to the standby control parameter and the awaking parameter transmitted by the scheduling process. The embedded system is enabled to enter the standby state rapidly due to the standby control parameter configured during reinitialization; and the embedded system is enabled to be awoken rapidly due to the awaking parameter configured during reinitialization.

In the embodiment of the disclosure, the standby process controlling the embedded system to enter a standby state refers to lowering the operating frequency of the embedded system and disabling some devices and peripherals of the embedded system, while initializing only devices used in processes with low power consumption, e.g., a timer, an infrared controller, an interruption controller, etc. The particular devices and peripherals of the peripheral device to be disabled may be indicated by the standby control parameter.

Based upon any one of the embodiments above of the method, after the master process exits, before the scheduling process starts the standby process of the embedded system, the scheduling process may determine whether the hardware resource and software resource are fully released by the master process; and if the hardware resource and software resource are fully released by the master process, then the scheduling process may start the standby process; and if the hardware resource and/or software resource are/is not fully released by the master process, then the scheduling process may clear and reinitialize the resource occupied by the master process according to information about the software resource and hardware resource initially allocated for the master process. Whether the hardware resource and software resource are fully released by the master process may be determined in a number of ways, and the disclosure will not be limited thereto. For example, the master process may transmit an indicator to the scheduling process to indicate whether the hardware resource and software resource are fully released by the master process, and the scheduling process may determine this from the indicator. Alternatively the master process may signal to the scheduling process that the hardware resource and software resource are fully released by the master process, and the scheduling process may determine this according to the signaling and the information about the software resource and the hardware resource initially allocated for the master process.

Based upon any one of the embodiments above of the method for awaking an embedded system, after the standby process releases the occupied hardware resource and exits, the scheduling process may determine whether the hardware resource and software resource are fully released by the standby process; and if the hardware resource and software resource are fully released by the standby process, then the scheduling process may further operate to awake the embedded system; otherwise, the scheduling process may clear and reinitialize the resource occupied by the standby process according to the information about the software resource and the hardware resource initially allocated for the standby process. Whether the hardware resource and software resource are fully released by the standby process may be determined in a number of ways, and the disclosure will not be limited thereto.

Figure 2:
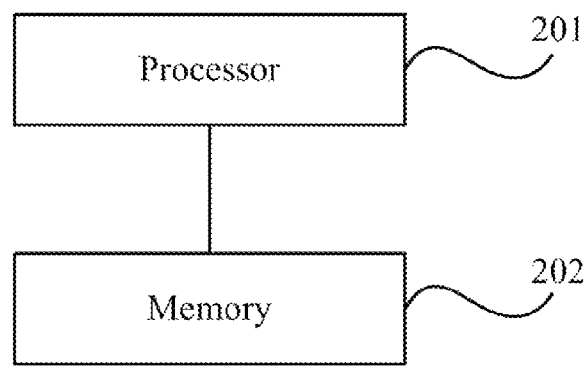
FIG. 2 illustrates a schematic structural diagram of a device with an embedded system according to some embodiments of the disclosure.

Based upon the same inventive idea as the method, some embodiments of the disclosure further provides a device with an embedded system, which is structured as illustrated in FIG. 2, the device may include:

A processor 201; and

A memory 202 storing at least one instruction, wherein the at least one instruction is configured, when executed by the processor 201, to:

cause a scheduling process of the embedded system to transmit a standby instruction to a master process of the embedded system;

cause the master process to release occupied hardware resource and to exit upon reception of the standby instruction;

cause the scheduling process to start a standby process of the embedded system after the master process exits; and cause the standby process to control the embedded system to enter a standby state.

In the device according to some embodiments of the disclosure, the master process releases the occupied resource instead of the threads therein releasing their respective occupied resource respectively. Since the master process can force the resource occupied by the respective threads thereof to be released, such a situation will not occur that the resource occupied by the threads cannot be released, thus avoiding the system from failing to enter a standby state or from becoming instable after being awoken due to failure of the resource to be released. Moreover since the master process releases the resource and exits, in order to enable the system to enter a standby state, the standby process is created in some embodiments of the disclosure so that the standby process controls the embedded system to enter a standby state. The scheduling process controls the order in which the master process and the standby process are performed, so as to ensure stable operation of the system.

When the at least one instruction causes the standby process to control the embedded system to enter a standby state, the at least one instruction may be configured to:

cause the standby process to control the embedded system to enter a standby ready state; and cause the standby process to control the embedded system to enter the standby state, after the embedded system enters the standby ready state.

The at least one instruction may be further configured, when executed by the processor 201, to:

cause the standby process to determine that the embedded system needs to be awoken; to control the embedded system to enter a standby ready state; and to release the occupied hardware resource and to exit after the embedded system enters the standby ready state; and cause the scheduling process to start the master process, after the standby process exits.

The at least one instruction may be further configured, when executed by the processor 201, to:

cause the standby process to determine that the embedded system needs to be awoken; to trigger the embedded system to be restarted; and to release the occupied hardware resource and to exit; and cause the scheduling process to start the master process, after the embedded system is restarted.

The at least one instruction may be further configured, when executed by the processor 201, to:

cause the scheduling process to transmit a standby control parameter, and an awaking parameter including at least an automatic awaking time, to the standby process after the master process exits;

When the at least one instruction causes the standby process to control the embedded system to enter a standby state, the at least one instruction may be configured to:

cause the standby process to control the embedded system to enter the standby state, according to the standby control parameter.

When the at least one instruction causes the standby process to determine that the embedded system needs to be awoken, the at least one instruction may be configured to:

cause the standby process to determine that the embedded system needs to be awoken, according to the automatic awaking time.

When the at least one instruction causes the standby process to determine that the embedded system needs to be awoken, the at least one instruction may be configured to:

cause the standby process to determine that the embedded system needs to be awoken, according to an awaking instruction transmitted by the scheduling process.

The device with an embedded system may be but will not be limited to a set-top box, a TV set, a handset, a tablet PC, a PDA or another terminal.

Figure 3:
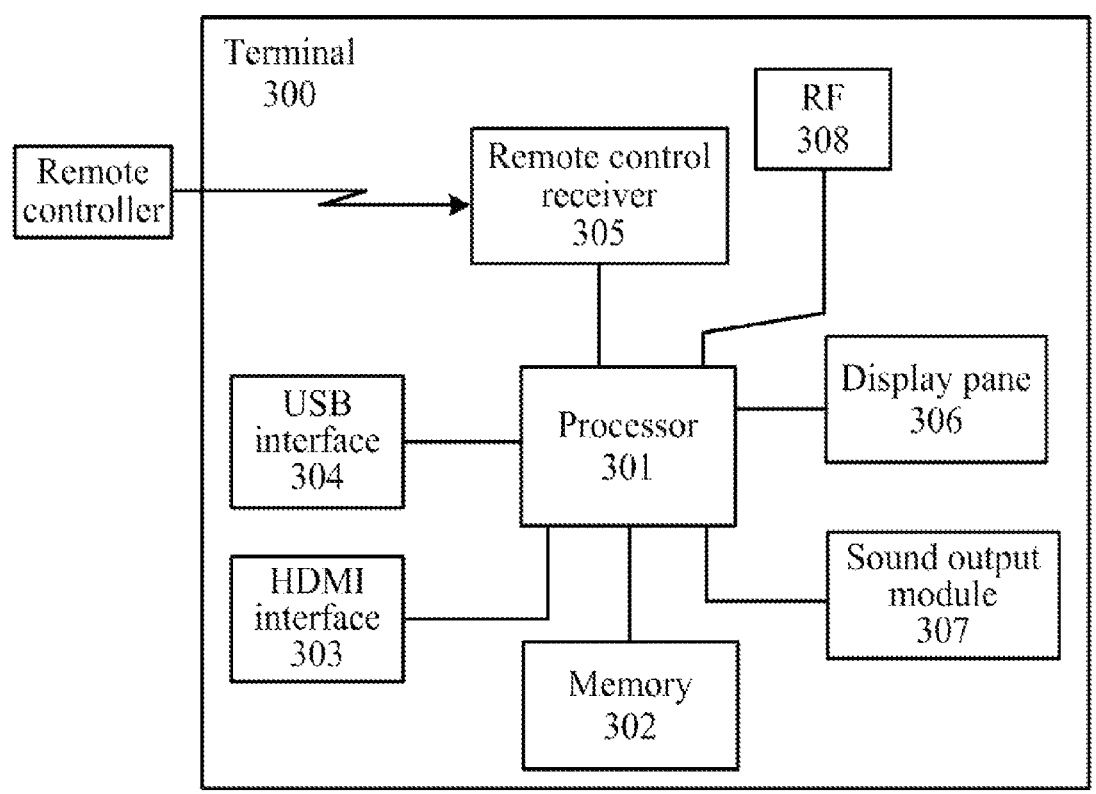
FIG. 3 illustrates a particular structural diagram of a device with an embedded system according to some embodiments of the disclosure.

Correspondingly, FIG. 3 illustrates a particular structural diagram of a device with an embedded system according to some embodiments of the disclosure. As illustrated in FIG. 3, a terminal 300 for controlling an embedded system according to some embodiments of the disclosure may include at least one input unit, at least one output unit, and at least one connection device in addition to a processor 301 and a memory 302. Those ordinarily skilled in the art shall appreciate that the terminal 300 for controlling an embedded system will not be limited to the structure as illustrated in FIG. 3 but may include more or less components than those as illustrated or some of the components may be combined or different components may be configured for different types of the terminal 300.

The memory 302 may be configured to store software programs and modules in addition to the at least one instruction as described in the embodiment in FIG. 2, and the processor 301 may be configured to run the software programs and modules stored in the memory to thereby perform various function applications and data processes. The memory 302 may include a high-speed random access memory and may further include a nonvolatile memory, e.g., at least one magnetic-disk memory device, a flash memory device or another volatile solid memory device. Furthermore the memory 302 may further include a memory controller configured to provide an access of the processor and the input unit to the memory 302.

The processor 301 is a control center of the terminal and has the respective components of the entire terminal 300 connected by various interfaces and lines. In addition to the at least one instruction, stored in the memory 302, configured as described in the embodiment in FIG. 2, the processor 301 may run or execute the software programs and/or modules stored in the memory 302 and invoke the data stored in the memory 302 to perform the various functions of the terminal 300 and process the data to thereby manage and control the terminal 300 as a whole. The processor 301 may include one or more processing cores. The processor 103 may be integrated with an application processor and a modem processor, where the application processor generally handles an operating system, user interfaces, applications, etc., and the modem processor generally handles wireless communication. As can be appreciated, the modem processor may not be integrated into the processor 301.

The input unit may include a TV and radio receiver, a High-Definition Multimedia (HDMI) interface 303, a USB interface 304, an audio and video input interface, and a remote controller 305. Moreover the input unit may further include a touch sensitive surface and other input devices, where the touch sensitive surface may be embodied in various types of resistive, capacitive, infrared, surface sound wave and other types, and the other input device may include but will not be limited to one or more of a physical keyboard, functional keys (e.g., volume control press keys, a power-on or -off press key, etc.), a track ball, a mouse, a joystick, etc.

The output unit is configured to output an audio signal, a video signal, an alert signal, a vibration signal, etc. The output unit may include a display panel 306, a sound output module 307, etc. The display panel 307 may be configured to display information input by a user or information provided to the user and various graphic user interfaces of the terminal 300, where these graphic user interfaces may be composed of graphics, texts, icons, videos and any combination thereof. For example, the display panel may be embodied as a Liquid Crystal Display (LCD), an Organic Light-Emitting Diode (OLED), a flexible display, a 3D display, a CRT, a plasmas display panel, etc.

The terminal 300 may further include at least one sensor (not illustrated), e.g., an optical sensor, a motion sensor and other sensors. Particularly the optical sensor may include an ambient optical sensor and a proximity sensor, where the ambient optical sensor may adjust the brightness of the display panel 306 according to the luminosity of ambient light rays, and the proximity sensor may power off the display panel and/or a backlight when the terminal 300 moves to some position. The terminal 300 may be further configured with a gyroscope, a barometer, a hygrometer, a thermometer, an infrared sensor and other sensors.

The terminal 300 may further include an audio circuit (not illustrated), and a speaker and a transducer may provide an audio interface between the user and the terminal 300. The audio circuit may convert received audio data into an electric signal and transmit the electric signal to the speaker, which is converted by the speaker into an audio signal for output; and on the other hand, the transducer converts a collected audio signal into an electric signal which is received by the audio circuit and then converted into audio data, and the audio data is further output to the processor 301 for processing and then transmitted to another terminal, for example, or the audio data is output to the memory 302 for further processing. The audio circuit may further include an earphone jack for communication between a peripheral earphone and the terminal 300.

Moreover the terminal 300 may further include a Radio Frequency (RF) circuit 308. The RF circuit 308 may be configured to receive and transmit a signal. Typically the RF circuit 308 includes but will not be limited to an antenna, at least one amplifier, a tuner, one or more oscillators, a Subscriber Identifier Module (SIM) card, a transceiver, a coupler, a Low Noise Amplifier (LNA), a duplexer, etc. Moreover the terminal 300 may further include a web cam, a Bluetooth module, etc.

Moreover the terminal 300 may further include a Wireless Fidelity (WiFi) module (not illustrated). The WiFi falls into the category of short-range wireless transmission technologies, and the terminal 300 may assist the user in receiving and transmitting an e-mail, browsing a webpage, accessing streaming media, etc., through the WiFi module by which the user is provided with a wireless access to the broadband Internet. Although the WiFi module is illustrated in FIG. 1, it can be appreciated that it may not be necessarily required for the terminal 300 but may be omitted as desired without departing from the scope of the disclosure.

Those skilled in the art shall appreciate that the embodiments of the disclosure may be embodied as a method, a system or a computer program product. Therefore the disclosure may be embodied in the form of an all-hardware embodiment, an all-software embodiment or some embodiments of software and hardware in combination. Furthermore the disclosure may be embodied in the form of a computer program product embodied in one or more computer useable storage mediums (including but not limited to a disk memory, a CD-ROM, an optical memory, etc.) in which computer useable program codes are contained.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram may be embodied in computer program instructions. These computer program instructions may be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions may also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions may also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A device having an embedded system, the device comprising:
   a processor; and
   a memory storing at least one instruction, wherein the processor is configured to execute the at least one instruction to:
   cause a scheduling process of the embedded system to transmit a standby instruction to a master process of the embedded system;
   cause the master process to release an occupied hardware resource and to exit, upon reception of the standby instruction;
   cause the scheduling process to start a standby process of the embedded system after the master process exits; and
   cause the standby process to control the embedded system to enter a standby state, the standby state including at least one of a lowered operating frequency of the embedded system, a disabled device and/or peripheral of the embedded system, and an initialized low power consumption device of the embedded system.

2. The device according to claim 1, wherein when the at least one instruction causes the standby process to control the embedded system to enter a standby state, and the processor is configured to execute the at least one instruction to:
   cause the standby process to control the embedded system to enter a standby ready state; and
   cause the standby process to control the embedded system to enter the standby state, after the embedded system enters the standby ready state.

3. The device according to claim 1, wherein the processor is further configured to execute the at least one instruction to:
   cause the standby process to determine that the embedded system needs to be awoken;
   control the embedded system to enter a standby ready state;
   release the occupied hardware resource and exit after the embedded system enters the standby ready state; and
   cause the scheduling process to start the master process, after the standby process exits.

4. The device according to claim 1, wherein the processor is further configured to execute the at least one instruction to:
   cause the standby process to determine that the embedded system needs to be awoken;
   trigger the embedded system to be restarted;
   release the occupied hardware resource and exit; and
   cause the scheduling process to start the master process, after the embedded system is restarted.

5. The device according to claim 3, wherein the processor is further configured to execute the at least one instruction to:
   cause the scheduling process to transmit a standby control parameter, and an awaking parameter comprising at least an automatic awaking time, to the standby process after the master process exits;
   when the processor causes the standby process to control the embedded system to enter a standby state, the processor is further configured to execute the at least one instruction to:
   cause the standby process to control the embedded system to enter the standby state, according to the standby control parameter.

6. The device according to claim 4, wherein the processor is further configured to execute the at least one instruction to:
   cause the scheduling process to transmit a standby control parameter, and an awaking parameter comprising at least an automatic awaking time, to the standby process after the master process exits;
   when the processor causes the standby process to control the embedded system to enter a standby state, the processor is further configured to execute the at least one instruction is configured to:
   cause the standby process to control the embedded system to enter the standby state, according to the standby control parameter.

7. The device according to claim 5, wherein when the processor causes the standby process to determine that the embedded system needs to be awoken, the processor is further configured to execute the at least one instruction to:
   cause the standby process to determine that the embedded system needs to be awoken, according to the automatic awaking time.

8. The device according to claim 6, wherein when the processor causes the standby process to determine that the embedded system needs to be awoken, the processor is further configured to execute the at least one instruction to:
   cause the standby process to determine that the embedded system needs to be awoken, according to the automatic awaking time.

9. The device according to claim 3, wherein when the processor causes the standby process to determine that the embedded system needs to be awoken, the processor is further configured to execute the at least one instruction to:
   cause the standby process to determine that the embedded system needs to be awoken, according to an awaking instruction transmitted by the scheduling process.

10. The device according to claim 4, wherein when the processor causes the standby process to determine that the embedded system needs to be awoken, the processor is further configured to execute the at least one instruction to:
    cause the standby process to determine that the embedded system needs to be awoken, according to an awaking instruction transmitted by the scheduling process.

11. A method for controlling an embedded system, the method comprising:
    transmitting, by a scheduling process of the embedded system, a standby instruction to a master process of the embedded system;
    releasing, by the master process, an occupied hardware resource and exiting, upon reception of the standby instruction;
    starting, by the scheduling process, a standby process of the embedded system after the master process exits; and controlling, by the standby process, the embedded system to enter a standby state, the standby state including at least one of a lowered operating frequency of the embedded system, a disabled device and/or peripheral of the embedded system, and an initialized low power consumption device of the embedded system.

12. The method according to claim 11, wherein controlling, by the standby process, the embedded system to enter the standby state comprises:
   controlling, by the standby process, the embedded system to enter a standby ready state; and
   controlling, by the standby process, the embedded system to enter the standby state, after the embedded system enters the standby ready state.

13. The method according to claim 11, wherein after the embedded system enters the standby state, the method further comprises:
   determining, by the standby process, that the embedded system needs to be awoken;
   controlling, by the standby process, the embedded system to enter a standby ready state;
   releasing, by the standby process, the occupied hardware resource and exiting after the embedded system enters the standby ready state; and
   starting, by the scheduling process, the master process after the standby process exits.

14. The method according to claim 11, wherein after the embedded system enters the standby state, the method further comprises:
   determining, by the standby process, that the embedded system needs to be awoken;
   triggering, by the standby process, the embedded system to be restarted, and releasing the occupied hardware resource and exiting; and
   starting, by the scheduling process, the master process after the embedded system is restarted.

15. The method according to claim 13, wherein after the master process exits, and before the scheduling process starts the standby process of the embedded system, the method further comprises:
   transmitting, by the scheduling process, a standby control parameter, and an awaking parameter comprising at least an automatic awaking time, to the standby process; and
   controlling, by the standby process, the embedded system to enter the standby state comprises:
   controlling, by the standby process, the embedded system to enter the standby state, according to the standby control parameter.

16. The method according to claim 14, wherein after the master process exits, and before the scheduling process starts the standby process of the embedded system, the method further comprises:
   transmitting, by the scheduling process, a standby control parameter, and an awaking parameter comprising at least an automatic awaking time, to the standby process; and
   controlling, by the standby process, the embedded system to enter the standby state comprises:
   controlling, by the standby process, the embedded system to enter the standby state, according to the standby control parameter.

17. The method according to claim 15, wherein determining, by the standby process, that the embedded system needs to be awoken comprises:
   determining, by the standby process, that the embedded system needs to be awoken, according to the automatic awaking time.

18. The method according to claim 16, wherein determining, by the standby process, that the embedded system needs to be awoken comprises:
   determining, by the standby process, that the embedded system needs to be awoken, according to the automatic awaking time.

19. The method according to claim 13, wherein determining, by the standby process, that the embedded system needs to be awoken comprises:
   determining, by the standby process, that the embedded system needs to be awoken, according to an awaking instruction transmitted by the scheduling process.

20. The method according to claim 14, wherein determining, by the standby process, that the embedded system needs to be awoken comprises:
   determining, by the standby process, that the embedded system needs to be awoken, according to an awaking instruction transmitted by the scheduling process.

* * * * *